US008923590B2

(12) United States Patent
Chen et al.

(10) Patent No.: US 8,923,590 B2
(45) Date of Patent: Dec. 30, 2014

(54) METHOD AND SYSTEM FOR 3D CARDIAC MOTION ESTIMATION FROM SINGLE SCAN OF C-ARM ANGIOGRAPHY

(75) Inventors: Mingqing Chen, Iowa City, IA (US); Yefeng Zheng, Dayton, NJ (US); Gareth Funka-Lea, Cranbury, NJ (US); Guenter Lauritsch, Nürnberg (DE); Jan Boese, Eckental (DE); Dorin Comaniciu, Princeton Junction, NJ (US)

(73) Assignee: Siemens Aktiengesellschaft, Munich (DE)

( * ) Notice: Subject to any disclaimer, the term of this patent is extended or adjusted under 35 U.S.C. 154(b) by 463 days.

(21) Appl. No.: 13/346,818

(22) Filed: Jan. 10, 2012

(65) Prior Publication Data

US 2012/0189185 A1 Jul. 26, 2012

Related U.S. Application Data

(60) Provisional application No. 61/434,558, filed on Jan. 20, 2011.

(51) Int. Cl.
*G06K 9/00* (2006.01)
*G06T 7/00* (2006.01)

(52) U.S. Cl.
CPC ............. *G06T 7/0083* (2013.01); *G06T 7/0089* (2013.01); *G06T 2207/10081* (2013.01); *G06T 2207/30048* (2013.01)
USPC .......................................... 382/131; 382/173

(58) Field of Classification Search
USPC .......................... 382/100, 128–132, 173, 154
See application file for complete search history.

(56) References Cited

U.S. PATENT DOCUMENTS

| | | | |
|---|---|---|---|
| 5,375,156 A * | 12/1994 | Kuo-Petravic et al. ........... 378/9 |
| 6,421,552 B1 | 7/2002 | Hsieh | |
| 6,701,174 B1 * | 3/2004 | Krause et al. ................ 600/407 |
| 7,689,021 B2 * | 3/2010 | Shekhar et al. ............... 382/131 |
| 7,893,938 B2 * | 2/2011 | Aharon ......................... 345/422 |
| 7,916,919 B2 | 3/2011 | Zheng et al. | |
| 8,023,710 B2 * | 9/2011 | Summers et al. ............. 382/131 |
| 8,107,703 B2 * | 1/2012 | Shekhar et al. ............... 382/128 |
| 8,411,914 B1 * | 4/2013 | Mangoubi et al. ............ 382/128 |
| 8,615,118 B2 * | 12/2013 | Yi et al. ........................ 382/128 |
| 2006/0270932 A1 * | 11/2006 | Aharon et al. ................ 600/421 |
| 2007/0153971 A1 | 7/2007 | Wang et al. | |
| 2007/0167758 A1 | 7/2007 | Costello | |
| 2009/0190811 A1 * | 7/2009 | Zheng et al. ................. 382/128 |
| 2010/0040272 A1 | 2/2010 | Zheng et al. | |

(Continued)

OTHER PUBLICATIONS

Feldkamp, L.A., et al., "Practical Cone-Beam Algorithm", Journal of the Optical Society of America A, Optics and Image Science, vol. 1, No. 6, Jun. 1964; pp. 612-619.

*Primary Examiner* — Shefali Goradia

(57) ABSTRACT

A method and system for estimating 3D cardiac motion from a single C-arm angiography scan is disclosed. An initial 3D volume is reconstructed from a plurality of 2D projection images acquired in a single C-arm scan. A static mesh is extracted by segmenting an object in the initial 3D volume. The static mesh is projected to each of the 2D projection images. A cardiac phase is determined for each of the 2D projection images. A deformed mesh is generated for each of a plurality of cardiac phases based on a 2D contour of the object and the projected mesh in each of the 2D projection images of that cardiac phase.

39 Claims, 10 Drawing Sheets

(56) References Cited

U.S. PATENT DOCUMENTS

| | | |
|---|---|---|
| 2010/0142787 A1 | 6/2010 | Zheng et al. |
| 2010/0189337 A1* | 7/2010 | Jandt et al. ............ 382/132 |
| 2010/0202664 A1 | 8/2010 | Busch et al. |
| 2011/0293155 A1 | 12/2011 | Nakanishi et al. |
| 2012/0069017 A1 | 3/2012 | Zheng et al. |

* cited by examiner

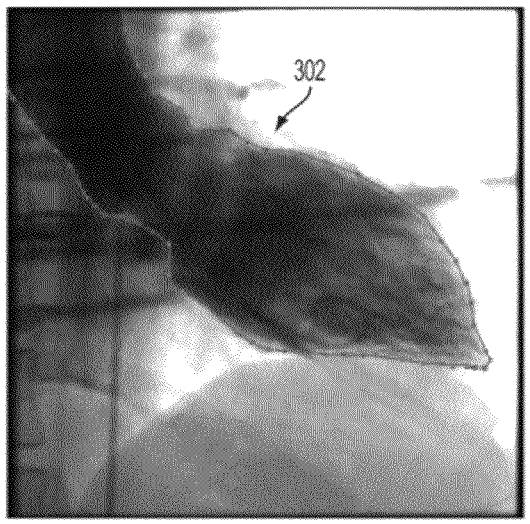
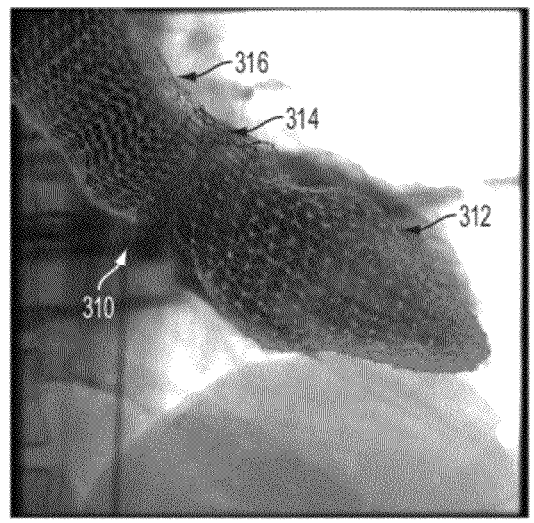
FIG. 3a            FIG. 3b
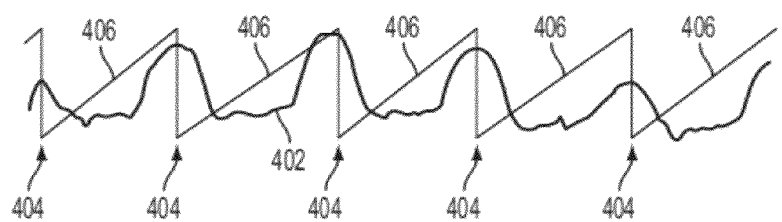
FIG. 4

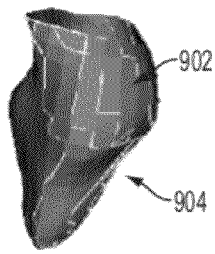
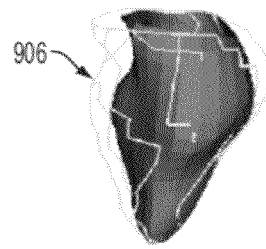
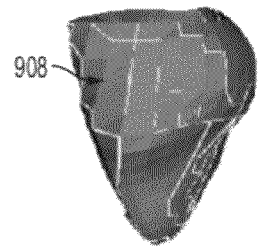
FIG. 9a         FIG. 9b         FIG. 9c
FIG. 10a         FIG. 10b         FIG. 10c
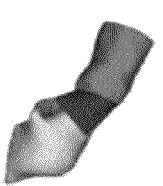
FIG. 10d         FIG. 10e

METHOD AND SYSTEM FOR 3D CARDIAC MOTION ESTIMATION FROM SINGLE SCAN OF C-ARM ANGIOGRAPHY This application claims the benefit of U.S. Provisional Application No. 61/434,558, filed Jan. 20, 2011, the disclosure of which is herein incorporated by reference.

BACKGROUND OF THE INVENTION

The present invention relates to cardiac imaging, and more particularly, to estimating 3D cardiac motion from a single scan of C-arm angiography.

Heart disease affects a large number of people globally and has become the leading cause of death in the United States. The estimation of cardiac motion and deformation is an area of concern in medical image analysis, as such cardiac motion and deformation has important clinical implications for the viability of the heart muscle. Various studies have attempted to address estimating cardiac motion and deformation in different imaging modalities, including cardiac computed tomography (CT), ultrasound, and magnetic resonance imaging (MRI).

The recent development of the C-arm image acquisition system provides greater flexibility by enabling generation of real-time fluoroscopy and 3D images of the heart on the same system during an interventional procedure. The C-arm image acquisition system generates a 3D image by reconstructing a 3D image from 2D projections. However, due to cardiac motion, the reconstructed 3D image is typically blurred due to averaging from all projections belonging to different cardiac phases. One possible way to extract cardiac motion is to map every projection to a specific cardiac phase by some registration operation. However, the accuracy of the image after transformation remains a question. Another possible approach is to perform multiple sweeps of the C-arm system and reconstructing a series of 3D images by retrospectively selecting projections that are close to a desired cardiac phase. Each sweep of the C-arm takes about five seconds, and typically six sweeps are necessary to generate enough projections at the same cardiac phase, resulting in a total scanning time of about 30 seconds. In real clinical practice, it is difficult to ask a patient to hold his or her breath for such a long period, especially for a severely ill patient or a patient under general anesthesia. In addition, multiple sweeps consume more contrast agent, which often causes side effects (e.g., allergy or renal insufficiency), and expose patients to more radiation. If only a single sweep is applied, there are a limited number of projection images available for each cardiac phase, which results in reconstruction artifacts due to missing data or residual motion.

BRIEF SUMMARY OF THE INVENTION

The present invention provides a method and system for estimating 3D cardiac motion from a single scan of C-arm angiography. The estimated 3D cardiac motion can be used to generate a motion-compensated 3D computed tomography (CT) reconstruction.

In one embodiment of the present invention, a 3D volume is reconstructed from a plurality of 2D projection images. The 2D projection images may be acquired in a single C-arm scan. A static mesh is extracted by segmenting an object in the initial 3D volume. The static mesh is projected to each of the 2D projection images. A cardiac phase is determined for each of the 2D projection images. A deformed mesh is generated for each of a plurality of cardiac phases based on a 2D contour of the object in each of the 2D projection images of that cardiac phase.

These and other advantages of the invention will be apparent to those of ordinary skill in the art by reference to the following detailed description and the accompanying drawings.

BRIEF DESCRIPTION OF THE DRAWINGS

FIG. 3 illustrates an example of projecting a 3D static mesh onto a 2D projection image;

FIG. 4 illustrates an example of determining relative cardiac phases using the size of 2D left ventricle contours in a set of projection images;

FIG. 9 illustrates exemplary deformation of a left ventricle mesh;

FIG. 10 illustrates exemplary results for estimating motion of the left ventricle, left ventricular outflow tract, and aorta from a single C-arm CT scan;

DETAILED DESCRIPTION

Figure 1A:
FIG. 1 illustrates C-arm CT reconstruction results from a single C-arm scan using an un-gated approach and using projection images from the same cardiac phase.
Figure 1B:
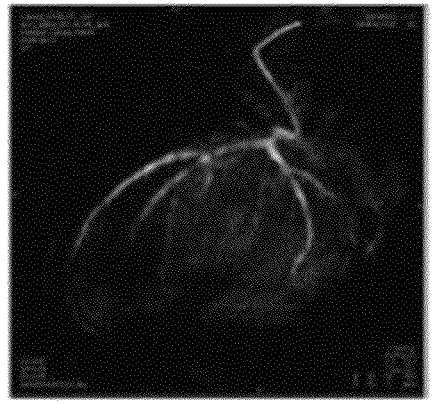
Figure 1C:
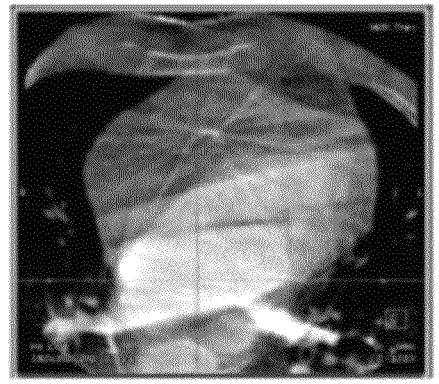
Figure 1D:
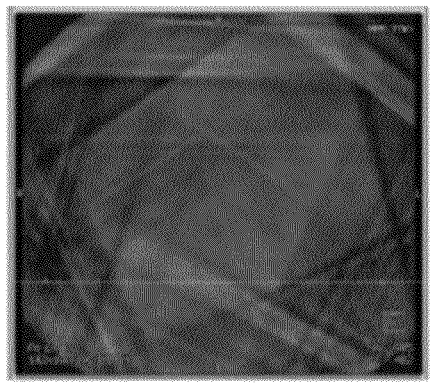

The present invention is directed to a method and system for three-dimensional (3D) cardiac motion estimation from a single scan of C-arm angiography. Embodiments of the present invention are described herein to give a visual understanding of the 3D cardiac motion estimation method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, it is to be understood that embodiments of the present invention may be performed within a computer system using data stored within the computer system.

Using a C-arm image acquisition system, it is possible to generate a 3D reconstructed computed tomography (CT) image by reconstructing a 3D image from 2D projections. However, due to cardiac motion, the reconstructed 3D image is typically blurred due to averaging from all projections belonging to different cardiac phases. Different from a traditional CT scanner, the gantry's speed in C-arm CT is much slower. In a typically C-arm angiography scan, the gantry takes about five to six seconds to rotate 200 degrees around a patient, generating 133 fluoroscopic images (projection images). If only a single sweep of the C-arm is applied, there are a limited number of projection images available for each cardiac phase, which results in reconstruction artifacts due to missing data and residual motion. FIG. 1 illustrates C-arm CT reconstruction results from a single C-arm scan using an un-gated approach and using projection images from the same cardiac phase. As illustrates in FIG. 1, image (a) shows a C-arm CT reconstruction of moving vessels using an un-gated approach in which a 3D image is reconstructed from all projection images without motion compensation. Image (b) shows a C-arm CT reconstruction of moving vessels using only five selected projection images from the same cardiac phase. Image (c) shows a C-arm CT reconstruction of the left ventricle using the un-gated approach, and image (d) shows a C-arm reconstruction of the left ventricle using only five selected projection images from the same cardiac phase. As shown in FIG. 1, using only projection images from the same cardiac phase can significantly reduce motion blurring for sparse high contrast organs, such as the vessels shown in images (a) and (b), but this approach may fail for larger low-contrast organs, such as the left ventricle shown in images (c) and (d).

Embodiments of the present invention provide a method for 3D cardiac motion estimation from a single C-arm scan. This method is initialized with a static 3D mesh which is the segmentation result of the volume reconstructed from all of the projections of a single C-arm scan. In each projection image, a 2D contour of target organs in pre-segmented, which is used to deform the static mesh. A cardiac phase is assigned to each projection mesh. Then, for each cardiac phase, the static mesh is deformed by transforming its projection silhouette to a 2D contour in all projection images that belong to that cardiac phase. Thus, for each cardiac phase, a deformed mesh can be derived based on all of the 2D contours corresponding to the cardiac phase.

Figure 2:
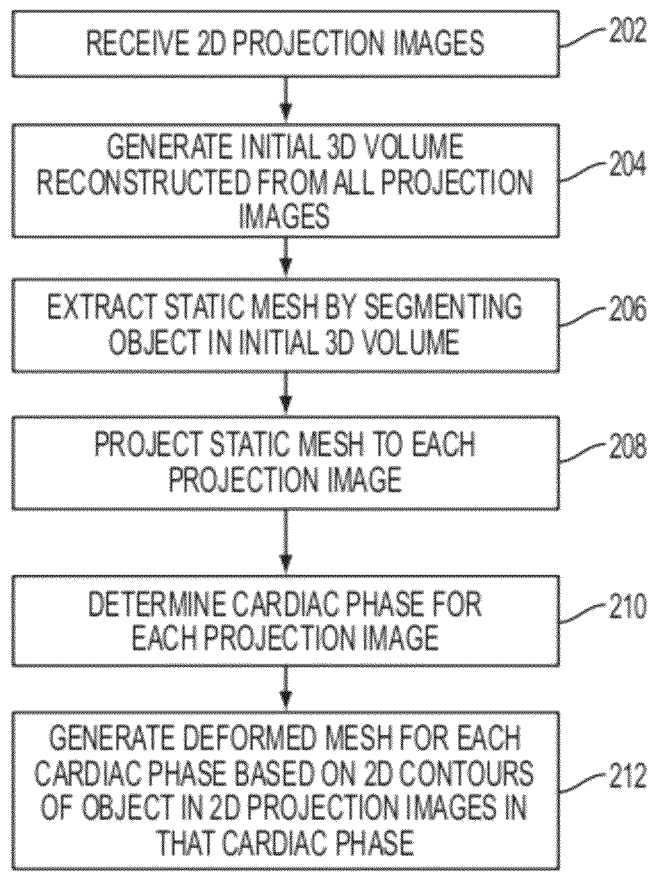
FIG. 2 illustrates a method for 3D cardiac motion estimation from a single scan of C-arm angiography according to an embodiment of the present invention.

FIG. 2 illustrates a method for 3D cardiac motion estimation from a single scan of C-arm angiography according to an embodiment of the present invention. As illustrated in FIG. 2, at step 202, a plurality of 2D projection images are received. According to an advantageous implementation, the 2D projection images are fluoroscopic images acquired by a C-arm image acquisition system in a single scan. The projection images may be received directly from a C-arm image acquisition system. Alternatively, the projection images may be previously acquired images loaded from memory or storage of a computer system.

At step 204, an initial 3D volume is reconstructed from all of the projection images. In particular, the initial 3D volume can be a 3D reconstruction generated from all of the projection images acquired in a single C-arm scan. The initial 3D volume can be reconstructed from all of the projection images without any motion compensation. There are many well-known techniques for reconstructing a 3D image (volume) from C-arm projection images, any of which may be used for reconstructing the initial 3D volume. For example, the 3D reconstruction techniques described in L. A. Feldkamp et al., "Practical cone-beam algorithm," Journal of the Optical Society of America A, Optics and Image Science, vol. 1, no. 6, pp. 612-619, 1984, which is incorporated herein by reference, may be used for reconstruction of the initial 3D volume.

At step 206, a static mesh is extracted by segmenting an object in the initial 3D volume. According to advantageous embodiments, the object is an anatomical object, such as a cardiac structure. In specific implementations described herein the object that is segmented can be one or more of the left ventricle, the left ventricular outflow tract (LVOT), and the aorta. The object can be segmented in the initial 3D volume by a series of trained machine-learning classifiers using marginal space learning (MSL).

MSL is used to estimate the position, orientation, and scale of the object(s) (e.g., left ventricle, LVOT, aorta) in the 3D volume using a series of detectors trained using annotated training data. MSL has recently been developed to apply learning based techniques for 3D object detection. For example, a method for MSL-based heart chamber segmentation is described in detail in U.S. Pat. No. 7,916,919, issued Mar. 29, 2011, and entitled "System and Method for Segmenting Chambers of a Heart in a Three Dimensional Image", which is incorporated herein by reference. In order to efficiently localize an object using MSL, parameter estimation is performed in a series of marginal spaces with increasing dimensionality. Accordingly, the idea of MSL is not to learn a classifier directly in the full similarity transformation space, but to incrementally learn classifiers in the series of marginal spaces. As the dimensionality increases, the valid space region becomes more restricted by previous marginal space classifiers. The 3D object detection is split into three steps: object position estimation, position-orientation estimation, and position-orientation-scale estimation. A separate classifier is trained based on annotated training data for each of these steps. This object localization stage results in an estimated transformation (position, orientation, and scale) of the object, and a mean shape of the object is aligned with the 3D volume using the estimated transformation. This results in an initial estimate of the object surface boundary. It is to be understood that if multiple objects (e.g., left ventricle, LVOT, and aorta) are segmented, separate classifiers are trained for each object and a mean shape of each object aligned with the 3D volume using the transformation estimated for each object.

At step 208, the 3D static mesh is projected to each of the 2D projection images. That is, for each projection image, each point of the static mesh is projected to a point on the 2D projection image, resulting in a projected mesh for each 2D projection image. A 4×3 projection matrix P is used to map any 3D point $(x, y, z, w_{3d})^T$ in a world coordinate system to a 2D position $(u, v, w_{2d})^T$ in the projection image coordinate system, where $w_{3d}$ and $w_{2d}$ are the normalization factors for 3D and 2D cases, respectively. The 3D or 2D vectors should be normalized to make $w_{3d}$ or $w_{2d}$ be 1 in order to make x, y, z or u, v represent real physical positions. The point goes to infinity when $w_{3d}$ or $w_{2d}$ becomes 0. A C-arm imaging system can be represented by a pinhole camera model. Ideally, P is the combination of extrinsic rotation R and translation T, and an intrinsic parameter matrix A. Once both the extrinsic parameters and the intrinsic parameters are calibrated, P can be uniquely identified. However, practically there will be some slight deviation of the C-arm system from the original geometry coordinate after a certain period and P should be calibrated from time to time.

The intrinsic parameter matrix A can be expressed as:

$$A = \begin{bmatrix} f & 0 & u \\ 0 & f & v \\ 0 & 0 & 1 \end{bmatrix}. \quad (1)$$

Here, f is the scale factor and (u,v) is the position of the pixel where the ray passes through the iso-center. The rotation R can be described by two angles in the C-arm system, α=cranio-caudal angle (CC) and β=right/left anterior orientation angle (RAO/LAO). Thus, the overall projection matrix is $P=ATR_\alpha R_\beta$. All the parameters can be extracted from the C-arm system or the saved DICOM image header.

FIG. 3 illustrates an example of projecting a 3D static mesh onto a 2D projection image. As illustrated in FIG. 3, image (a) shows an angiographic projection image overlaid with a contour 302 of the left ventricle (LV) 302, LVOT, and aorta. Image (b) shows the projection image overlaid with a projected static mesh 310 including the LV 312, LVOT 314, and aorta 316.

Returning to FIG. 2, at step 210, a cardiac phase is determined for each projection image. In a single C-arm angiography scan, the gantry typically takes about five to six seconds to rotate 200 degrees around a patient, and 133 fluoroscopic images (i.e., 2D projection images) are generated. Since a typical heart rate is around 60 beats per minute, there are about five to six heart cycles observable in the 133 projection images acquired during a single scan. Accordingly, a single heart cycle occurs over approximately 25 projections. The whole heart cycle is discretized into the averaged number of projections in one cycle for the patient. A phase of the heart cycle is then determined for each projection image.

The cardiac phase information for each projection image is often captured in an electrocardiograph (ECG) signal. Accordingly, in one embodiment the cardiac phase information from an ECG signal acquired at the same time the projection images were acquired is matched to the projection images to determine a cardiac phase for each projection image.

In another embodiment, for example in the absence of an ECG signal, since the heart chamber dilates and contracts in each cardiac phase, it is possible to use the size of the projected 2D cardiac organ to represent the relative phase, which can be determined directly from the 2D contour of cardiac organ on each projection image. The 2D contour can be detected manually (i.e., manual annotation) or by using automatic or semi-automatic methods to segment the 2D contour. For example the size of the LV contours in the 2D projection image can be used to determine cardiac phases for the projection images. As the size of the contour is affected by the rotation angle at which the projection image was acquired, it is inaccurate to directly estimate the percentage of the cardiac phase from the size of the contour in a projection image. However, by plotting the size of the contour in each projection image with respect to the rotation angle of each projection image, the local maxima of contour size can be detected and the projection image with the local maxima determined as the beginning of a new cardiac cycle.

FIG. 4 illustrates an example of determining relative cardiac phases using the size of 2D LV contours in a set of projection images. As shown in FIG. 4, curve 402 shows a plot of the LV contour size with respect to rotation angle of the projection images. As illustrated by curve 402, one can easily identify the contraction and dilation of the LV. The local size maximums of the LV contour are shown by the vertical lines 404. Lines 406 show the relative phase assigned to each projection image. The relative cardiac phase of the projection images can be denoted as phase(n), where n is the index of the projection image from 0 to 132. For each projection image $n_{max}(i)$ that is a local maximum, zero is assigned as the phase to represent the starting phase of a new cardiac cycle, such that phase($n_{max}(i)$)=0. By linear interpolation between neighboring starting frames, a cardiac phase can be assigned to each projection image in the entire sequence. The starting and ending frames in the sequence require extrapolation using the average phase length.

Figure 5:
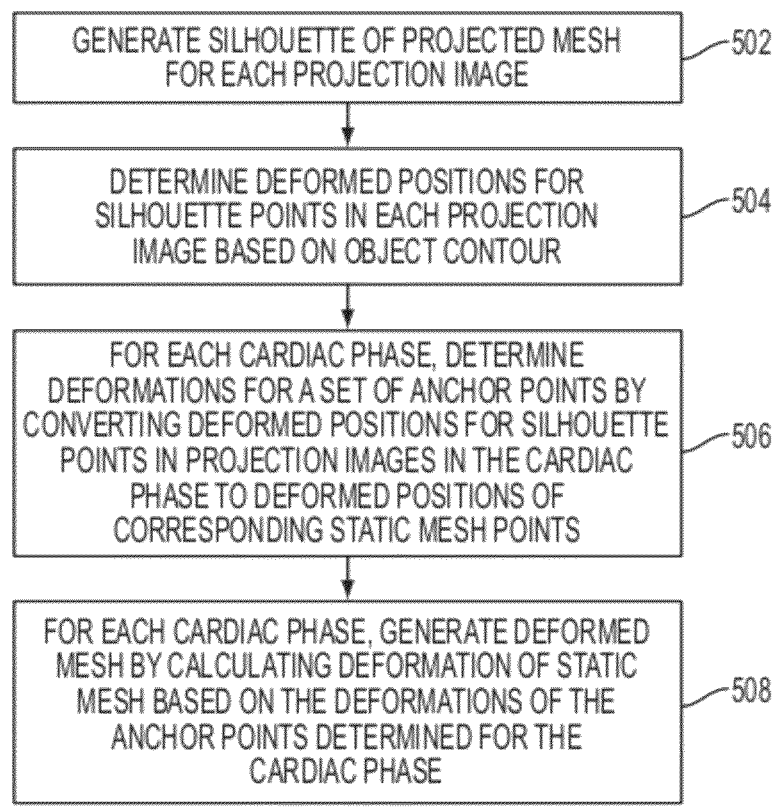
FIG. 5 illustrates a method for generating a deformed mesh for each cardiac phase according to an embodiment of the present invention.

Returning to FIG. 2, at step 212, a deformed mesh is generated for each cardiac phase based on 2D contours of the object in the 2D projection images in that cardiac phase. In particular, points of the projected mesh in the projection images are deformed based on a 2D contour of the object in the projection images and the deformations of mesh points in projection images of the same cardiac phase are used to calculate a deformation of the 3D static mesh for that cardiac phase. FIG. 5 illustrates a method for generating a deformed mesh for each cardiac phase according to an embodiment of the present invention. The method of FIG. 5 is used to implement step 212 of FIG. 2.

Figure 6:
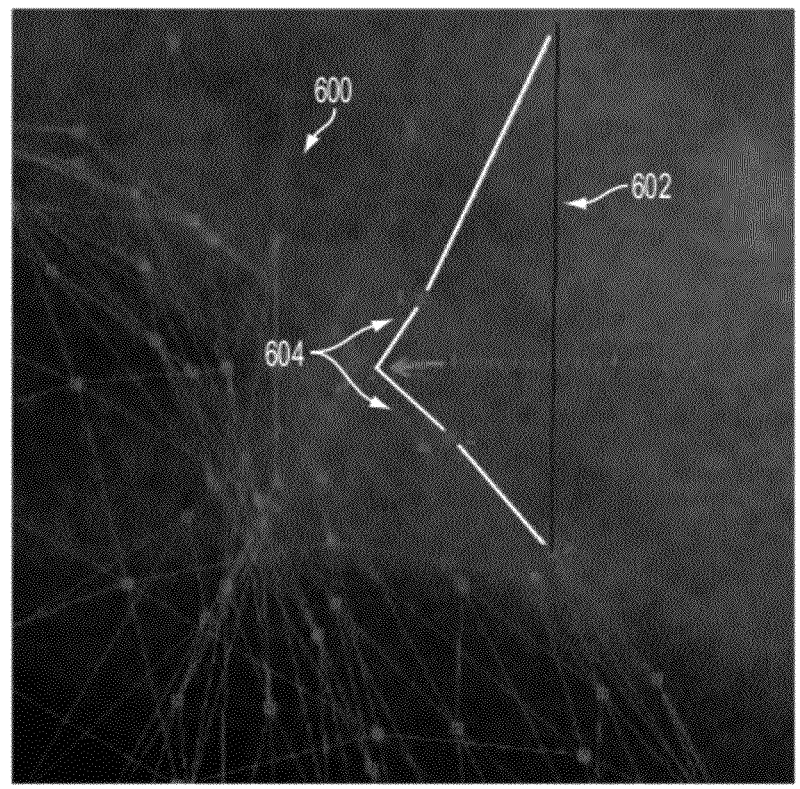
FIG. 6 illustrates exemplary silhouette detection on a projected mesh of the left ventricle.

As illustrated in FIG. 5, at step 502, a silhouette of the projected mesh is generated or each projection image. In order to utilize a 2D contour of the object to deform the projected mesh in a projection image, the silhouette of the projected mesh should be detected in order to establish point correspondence between the projected mesh and the silhouette. There are a number of possible approaches to extracting the silhouette of the projected mesh. For example, it is possible to use a convex hull or local convex hull of a set of mesh points. However, this approach does not utilize high level semantic information (e.g., the connectivity of edges) from the original mesh, and may result in missing a number of points and an edge on the silhouette may not be among the original mesh edges. Moreover, a mesh silhouette is not composed with only full length original edges, and an intersection point on the silhouette may split the original edge. FIG. 6 illustrates exemplary silhouette detection on a projected mesh of the left ventricle. As shown in FIG. 6, the small rectangles and lines are the points and edges of the projected mesh 600, respectively. Applying a local convex hull to the projected mesh 600, it is possible the line 602 from A to E is determined to be an edge of the silhouette. However, this does not satisfy the strict requirements (described below), and the silhouette path 604 from A to E should go through ABCDE, where A, B, D, and E are projected mesh points and C is an intersection point.

Considering the situations described above, in advantageous embodiments of the present invention two strict requirements of the silhouette are enforced:
1. No point or edge can be outside the silhouette; and
2. Each silhouette edge is part or full length of an original projected mesh edge.

A method for generating a silhouette that strictly satisfies the above requirements is described in U.S. patent application Ser. No. 13/35,802, filed on Sep. 19, 2011, and entitled "Method and System for Efficient Extraction of a Silhouette of a 3D Mesh", which is incorporated herein by reference. The general steps of this method are as follows:
1. Determine candidate edges from all of the edges of the projected mesh;
2. Split intersecting candidate edges; and
3. Edge following on the split edges to extract the silhouette.

Calculating the intersection of every pair of two edges in very time consuming. In the method of U.S. patent application Ser. No. 13/385,802, the majority of the edges of the projected mesh can be discarded by performing topology analysis which requires minimal computation under the assumption of a closed-surface mesh. However, in embodiments of the present invention the aorta and LVOT mesh has two openings on the inflow and outflow ends, while the LV mesh has one opening in the outflow end. According to an advantageous implementation, it is possible to distinguish the opening points or edges by counting triangles. Typically on an opening, an edge belongs to only one triangle, which is different from other edges of the mesh with two triangles. In this way, whether an edge is on the opening can be distinguished.

According to an embodiments of the present invention, the following two steps are used for edge selection, which deviate from the approach used in U.S. patent application Ser. No. 13/385,802, in order to take into account the differences at the openings of the mesh:
1. If an edge belongs to only one triangle, (i.e., an edge on an opening), the edge is considered a candidate edge;
2. If an edge belongs to two triangles (i.e., an edge not on an opening), the end points of the edge can be denoted as A and B, and the third point of the two triangles denoted as $C_1$ and $C_2$, respectively. If $C_1$ and $C_2$ are on the same side of edge AB, then edge AB is a candidate edge.

Calculation of the intersection of every pair of two edges can be sped up by performing an efficient condition check first, which determines whether a pair of edges have overlap in each dimension of the coordinate system. Suppose the first edge has two end points $A_1$ and $B_1$, and the second edge has end points $A_2$ and $B_2$. The condition is expressed as follows:

$$\max(\min(A_1(x),B_1(x)),\min(A_2(x),B_2(x))) > \min(\max(A_1(x),B_1(x)),\max(A_2(x),B_2(x))). \quad (2)$$

The two edges have no intersection in the x direction if the above condition is true. The same rule is also applied to the y direction. Since a large portion of edge pairs satisfy this condition, the time spent on calculation of intersections can be greatly reduces. Those edge pairs for which the condition checks determine that they overlap horizontally or vertically are then compared to determine if they intersect and if so where they intersect. If an intersection is found between a candidate edge and another edge, the candidate edge is split and replaced by two edges in the set of silhouette candidate edges by adding a mesh point at the intersection.

The edge following process is the final step to extract the silhouette from the set of candidate edges including the split edges. The edge following process is initialized with the left most point of the projected mesh, which is guaranteed to be in the silhouette. The straight downward direction is defined as the starting direction. The process then iteratively finds the right most neighbor point connected to the current point. The iterations end when the process returns to the starting point. Once the edge splitting is performed, the process is guaranteed to return to the starting point.

Returning to FIG. 5, at step 504, deformation positions of silhouette points in each of the projected images are determined based on a contour of the object in the projection images. The contour of the target object is segmented in each of the 2D projection images. For example, the LV, LVOT, and/or aorta contour can be segmented in the 2D projection images. In one possible implementation, the target object can be manually segmented or annotated in each projection image. According to another possible implementation, semi-automatic or automatic object segmentation methods can be used to segment the target object. For example, the methods described in United States Published Patent Application No. 2010/0040272 and United States Published Patent Application No. 2010/0142787, both of which are incorporated herein by reference, may be used for automatic segmentation of the LV in the 2D projection images.

Figure 7:
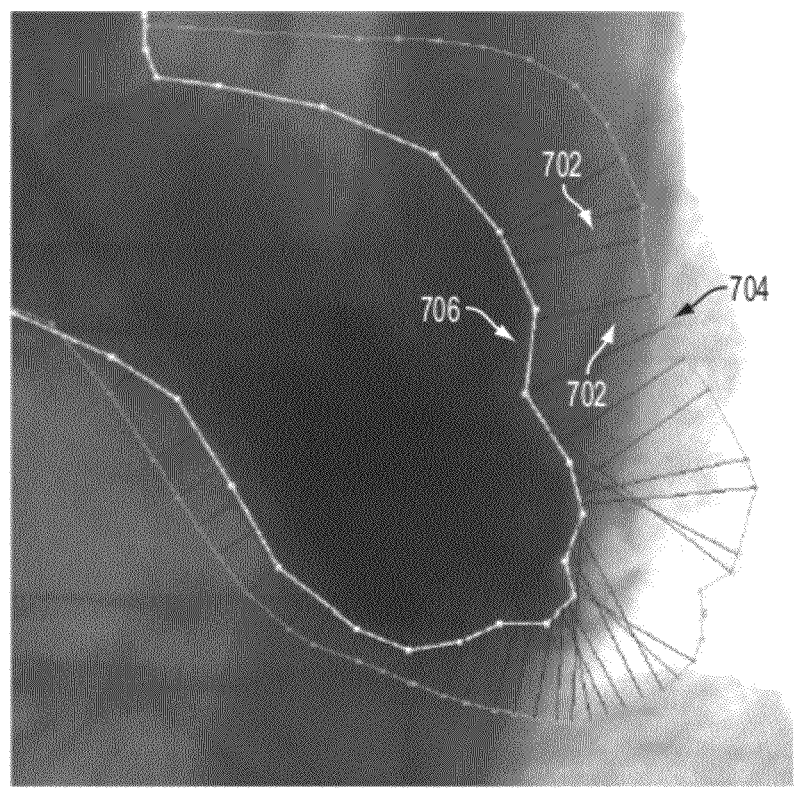
FIG. 7 illustrates exemplary results of determining deformed positions of silhouette points in a 2D projection image.

There are two types of points on the silhouette of each projected mesh: the points generated to split intersected edges and original projected mesh points. There is no corresponding 3D position for a split point, since the two projected edges that intersect in 2D are not actually coplanar in 3D. Accordingly, in an advantageous implementation deformed positions are only determined for the silhouette points that correspond to original projected mesh points. These silhouette points that are original projected mesh points can be used an anchor points for generation of a deformed 3D mesh (described below). In order to calculate the deformation position of a silhouette point, the silhouette point is displaced in a normal direction projected from the 3D mesh to be on the 2D object contour. An original 3D mesh point is denoted as P and its 2D projection on projection image f is $P_f$. The displaced position of P is P'. It can be assumed that for small movement of contraction and dilation of the aorta and left ventricle, the mesh points move in the normal direction of the surface. The normal direction of a mesh point in the 3D static mesh can be calculated as the average of the normal directions of the neighboring triangles of the mesh point. An arbitrary point along the $P_n$ along the normal direction of P can be selected. To project the normal direction to the 2D projection image f, the point $P_n$ can be projected to the 2D projection image f resulting in the projected point $P_{nf}$. The deformed position of $P_f$ on the 2D projection f, $P'_f$, is determined as the intersection of the 2D object contour with the projected normal line determined by $P_f$ and $P_{nf}$. FIG. 7 illustrates exemplary results of determining deformed positions of silhouette points in a 2D projection image. As shown in FIG. 7, displacements 702 are calculated to deform points on a silhouette 704 of a projected mesh to a pre-segmented blood pool contour 706.

Returning to FIG. 5, at step 506, for each cardiac phase, deformations for a set of anchor points are determined by converting the deformed positions of silhouette points in the projection images in the cardiac phase to deformed positions of the corresponding static mesh points. That is, for each deformed position $P'_f$ determined in a 2D projection image f, the corresponding 3D position P' is determined. Since P' is the 3D position of $P'_f$, P' can be determined based on the projection matrix P (described above) and constraints of P and $P_n$.

Figure 8:
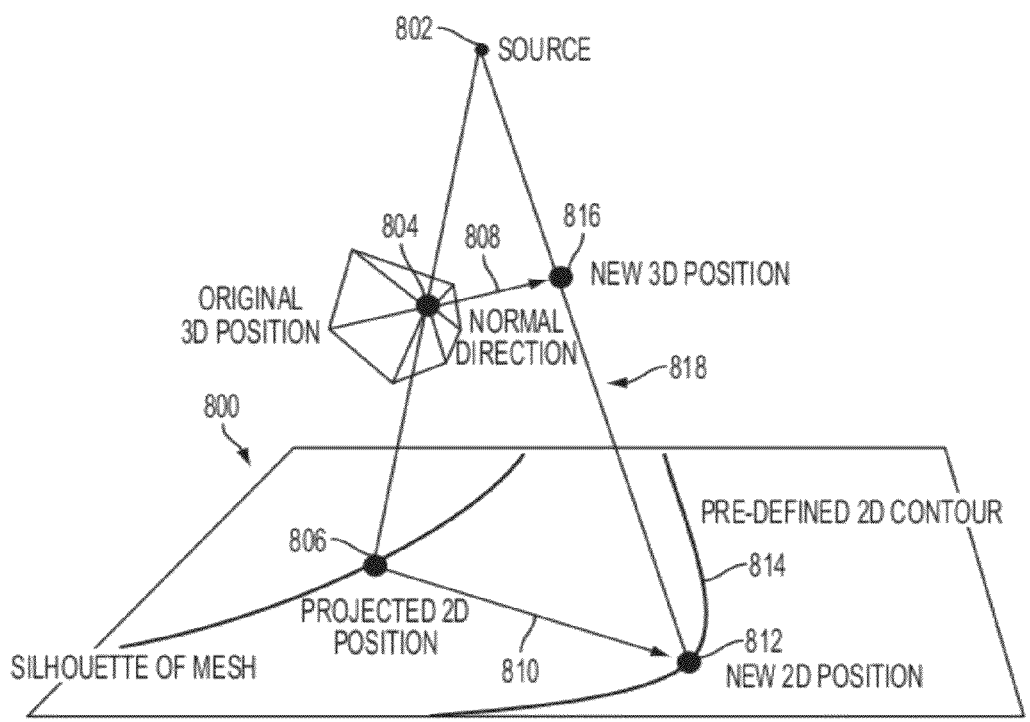
FIG. 8 illustrates determining a deformation of a mesh point based on a contour in a 2D projection image.

FIG. 8 illustrates determining a deformation of a mesh point based on a contour in a 2D projection image. Referring to FIG. 8, the C-arm imaging system can be represented by a pinhole camera model in which a point at an original 3D position 804 is projected from a source 802 to a projected 2D position 806 on a 2D projection image 800. The normal direction 808 of a mesh point at the 3D position 804 is calculated as the average of the normal directions of the neighboring triangles. The normal direction 808 is projected as a projected normal direction 810 on the 2D projection image 800 by projecting an arbitrary point along the normal direction 808 to the 2D projection image 800. The deformed position 812 of a silhouette point at position 806 on the 2D projection image 800 is determined as the intersection of the projected normal direction 810 and a pre-defined 2D contour 814 of a target object. The deformed position 816 of the original mesh point at position 804 is determined as the intersection of the normal direction 808 with a projection line 818 from the source 802 to the deformed position 812 on the 2D projection image 800.

The mesh points of the static mesh that correspond to silhouette points on 2D projection images having the same cardiac phase define a set of anchor points for that cardiac phase. The deformed positions of the silhouette points in the 2D projection images are converted to 3D deformed positions of the corresponding static mesh points, and 3D deformed positions of the static mesh points resulting from 2D projection images having the same cardiac phase define deformations (displacements) for the set of anchor points for that cardiac phase. It is possible that a mesh point is on the silhouettes in multiple projection images, even though the rotation between two projections of the same cardiac phase will be approximately 30 degrees. In this case the deformation of that mesh point is averaged based on the deformed positions determined from each of the projection images in which that mesh point is on the silhouette. To avoid irregularities in the deformed mesh, points with very large displacements and points on an opening may be discarded, since these points may not obey the assumption that motion is along the normal direction.

Returning to FIG. 5, at step 508, or each cardiac phase deformed mesh is generated by calculating the deformation of the static mesh based on the anchor points determined for that cardiac phase. There are typically five or six corresponding projection images belonging to one cardiac phase, and the deformation for the static mesh points on the silhouettes generated in those projection can be estimated (as described above in steps 504 and 506). However, interpolation is needed to estimate the deformation of the whole 3D mesh. Among various interpolation techniques, thin-plate spline (TPS) interpolation is a popular approach used in coordinate transformation. TPS is the multi-dimension analog of the cubic spline in 1 D. It is a fundamental solution to the bi-harmonic equation $\Delta^2 U=0$ with the form $U(r)=r^2 \ln(r)$, where r is the distance to the center. It is a powerful technique when used in the interpolation of transformation. Given a set of anchor points $x_i$ and their displacements $y_i$, the interpolation function f(x) is a weighted combination of thin plate splines centered about each data point that passes through the points exactly:

$$f(x) = \sum_{i=1}^{k} c_i U(\|x - y_i\|), \quad (3)$$

where $\|\cdot\|$ denotes the Euclidean norm and $c_i$ is a set of mapping coefficients. The mapping function f(x) is the configuration of lowest physical bending energy consistent with the given anchor points. In 2D, this function minimizes:

$$E = \int\int R^2 \left( \left(\frac{\partial^2 z}{\partial x^2}\right)^2 + 2\left(\frac{\partial^2 z}{\partial x \partial y}\right) + \left(\frac{\partial^2 z}{\partial y^2}\right) \right) dx dy, \quad (4)$$

where the function is the integral of the bending energy at each point.

It is not always desirable to transform an anchor point exactly to its new location. This is because the assumption that motion is along the normal direction is not always true, although it is a good approximation, and the displacements vectors from some mesh points may intersect with each other (which can be observed in FIG. 7), which will cause irregularity in the shape of the deformed mesh. To deal with these situations, TPS interpolation enables the use of regularization to relax the requirement that the transformation function pass through anchor points exactly. According to an embodiment of the present invention, a smoothing TPS can be applied, which minimizes:

$$E = \sum_{i=1}^{k} \|f(x_i) - y_i\|^2 + \lambda \int\int R^2 \left( \left(\frac{\partial^2 z}{\partial x^2}\right)^2 + 2\left(\frac{\partial^2 z}{\partial x \partial y}\right) + \left(\frac{\partial^2 z}{\partial y^2}\right) \right) dx dy \quad (5)$$

where $\lambda$ is a parameter to control how much non-rigidity is allowed for the deformation. When $\lambda \to 0$, it is identical to no regularization. When $\lambda \to \infty$, the TPS is reduced to an affine transformation, as the roughest model for non-rigid deformation. The regularization parameter $\lambda$ should be carefully selected by one of skill in the art based on experimentation to achieve accurate results. A too large or too small $\lambda$ may reduce the transformation accuracy. On one hand a large $\lambda$ causes a large deviation of the anchor points from their detected locations. On the other hand a small $\lambda$ may bring an irregular zigzag pattern to the deformed mesh. In this situation, more anchor points are no longer on the silhouette after transmission, so the new silhouette will not be on the desired position either.

According to an advantageous implementation, the TPS interpolation is used to deform all of the points on the static mesh to generate a deformed mesh for each cardiac phase based on the anchor points and corresponding deformations for that cardiac phase. FIG. 9 illustrates exemplary deformation of a left ventricle mesh. As illustrated in FIG. 9, image (a) shows an original static mesh 902 and corresponding silhouettes 904 from five projection images of the same cardiac phase. Image (b) shows the deformed silhouettes 906 resulting from the motion estimation on the five projection images. Image (c) shows the warped mesh 908 using the thin-plate spline model with the silhouettes as anchor points.

FIG. 10 illustrates exemplary results for estimating motion of the LV, LVOT, and aorta from a single C-arm CT scan using the methods of FIGS. 2 and 5. As illustrated in FIG. 10, images (a), (b), (c), (d), and (e) show deformed meshes for the LV, LVOT, and aorta at five different cardiac phases. In particular, images (a), (b), (c), (d), and (e) show the deformed mesh at 0%, 20%, 40%, 60%, and 80% of the cardiac cycle, respectively. The deformed meshes in FIG. 10 all originate from a static mesh that was segmented from a 3D volume reconstructed from all the projections containing information from all cardiac phases. The static mesh can only serve as a rough estimate of the organ boundary, and when projected to each 2D projection image, there is some displacement between the silhouette of the static mesh and pre-segmented blood pool contour that serves as a ground truth (as shown in FIG. 7).

Figure 11:
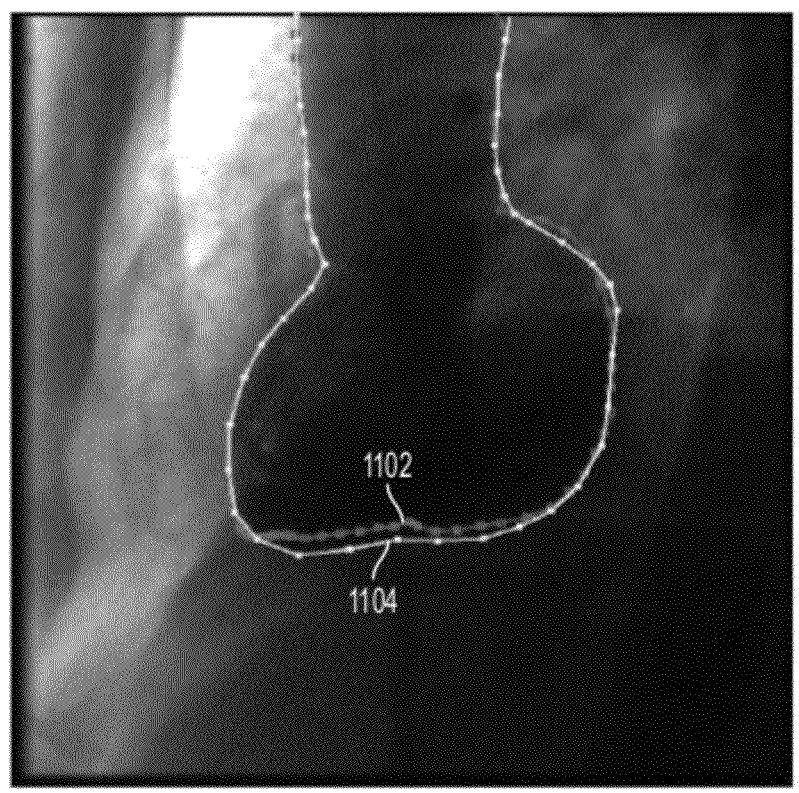
FIG. 11 illustrates the deformed mesh projected onto a 2D projection image.

The effect of performing the deformed mesh estimation can be visualized by re-projecting the deformed mesh onto a 2D projection image, where the displacement is reduced. FIG. 11 illustrates the deformed mesh projected onto a 2D projection image. As shown in FIG. 11, the displacement between the silhouette 1102 of the projected deformed mesh and the 2D blood pool contour 1104 is greatly reduced as compared with FIG. 7. It can be observed in FIG. 11 that the silhouette 1102 of the projected deformed mesh is slightly different than the ground truth contour 1104. There are two reasons that limit the transformation to the desired position: (1) Some anchor points exist in more than one silhouette. The displacements of these anchor points are averaged. (2) An anchor point may no longer be on the outline after transformation. One possible way to improve accuracy is to perform multiple iterations. In each new iteration, the deformed mesh is re-projected onto the 2D projection images belonging to the corresponding phase. The only difference from the first iteration is that there are $N_{ave}$ meshes used for projection, each one corresponding to several projection images belonging to the corresponding phase. The deformed mesh is closer to the contour in each iteration, and the amount of adjustment decreases. In a possible implementation two or three iterations may be sufficient to derive accurate results. The results in FIG. 11 are shown after two iterations.

The regularization parameter $\lambda$ should be carefully selected by one of skill in the art based on experimentation to achieve accurate results. A too large or too small $\lambda$ may reduce the transformation accuracy. On one hand a large $\lambda$ causes a large deviation of the anchor points from their detected locations. On the other hand a small $\lambda$ may bring an irregular zigzag pattern to the deformed mesh. In this situation, more anchor points are no longer on the silhouette after transmission, so the new silhouette will not be on the desired position either. According to an advantageous implementation, a relatively large λ can be used at first and the value for λ can be decreased after each iteration.

Embodiments of the present invention estimate 3D cardiac motion from a single C-arm scan. Without performing artifact-prone motion correlated reconstruction, the embodiments described herein are very helpful for 3D visualization of heart chamber motion, including neighboring organs, such as the ascending aorta. The mapping from a static mesh to a deformed mesh is very accurate, since the silhouette of the mesh is served as anchor points during the interpolation of transformation. For fluoroscopic images with very low contrast, the re-projection of the deformed mesh can also help clinicians to accurately identify the target organs. In addition to estimating cardiac motion in C-arm CT, embodiments of the present invention can be applied to other organs that have similar cyclic patterns of motion, such as the lung and liver. One potential application is estimation of respiratory motion and deformation of lung and tumor in mega-voltage cone beam CT, where the rotation of the gantry is much slower than C-arm and the respiratory cycles during a single scan (about 10 to 15) are sufficient to create a deformed mesh.

Figure 12:
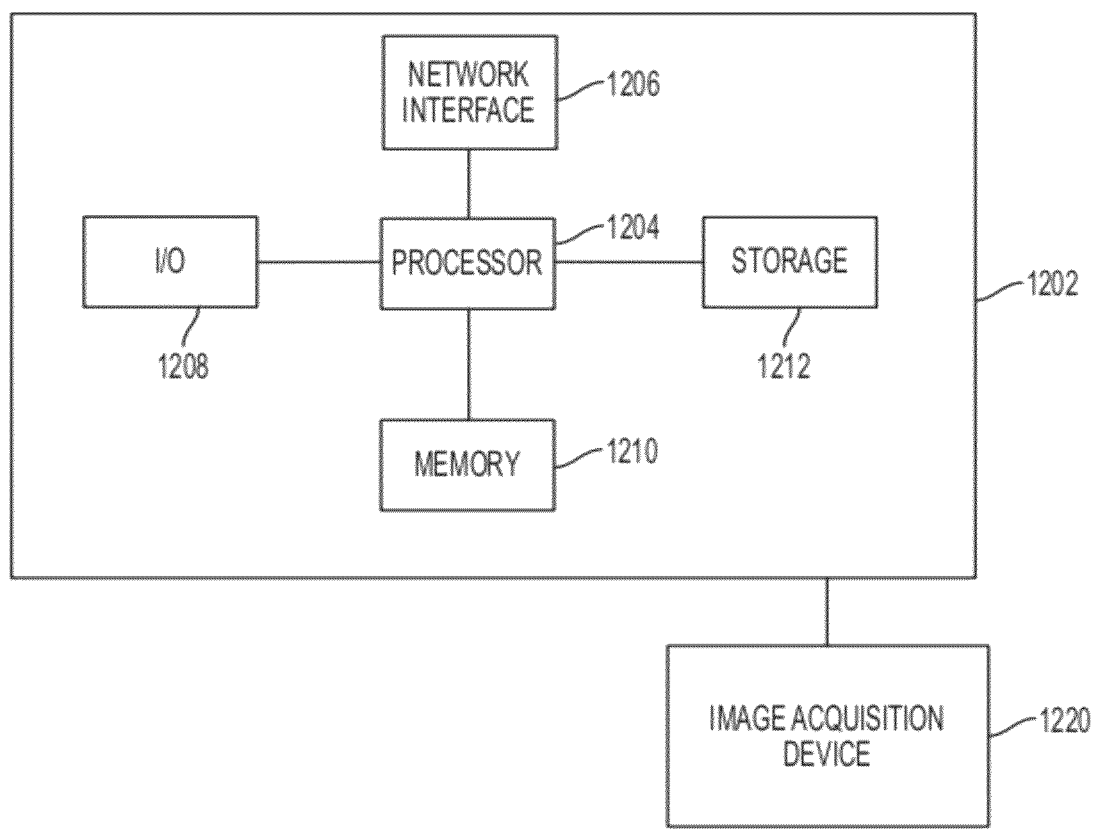
FIG. 12 is a high level block diagram of a computer capable of implementing the present invention.

The above-described methods for cardiac motion estimation from a single C-arm scan may be implemented on a computer using well-known computer processors, memory units, storage devices, computer software, and other components. A high level block diagram of such a computer is illustrated in FIG. 12. Computer 1202 contains a processor 1204 which controls the overall operation of the computer 1202 by executing computer program instructions which define such operation. The computer program instructions may be stored in a storage device 1212, or other computer readable medium (e.g., magnetic disk, CD ROM, etc.) and loaded into memory 1210 when execution of the computer program instructions is desired. Thus, the steps of the methods of FIGS. 2 and 5 may be defined by the computer program instructions stored in the memory 1210 and/or storage 1212 and controlled by the processor 1204 executing the computer program instructions. An image acquisition device 1220, such as a C-arm image acquisition device, can be connected to the computer 1202 to input images to the computer 1202. It is possible to implement the image acquisition device 1220 and the computer 1202 as one device. It is also possible that the image acquisition device 1220 and the computer 1202 communicate wirelessly through a network. The computer 1202 also includes one or more network interfaces 1206 for communicating with other devices via a network. The computer 1202 also includes other input/output devices 1208 that enable user interaction with the computer 1202 (e.g., display, keyboard, mouse, speakers, buttons, etc.). One skilled in the art will recognize that an implementation of an actual computer could contain other components as well, and that FIG. 12 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

Those skilled in the art could implement various other feature combinations without departing from the scope and spirit of the invention.

The invention claimed is:

1. A method of estimating 3D motion of an object from a set of 2D projection images, comprising:
reconstructing a 3D volume from a plurality of 2D projection images;
extracting a static mesh by segmenting an object in the 3D volume;
projecting the static mesh to each of the 2D projection images;
determining a cardiac phase for each of the 2D projection images; and
generating a deformed mesh for each of a plurality of cardiac phases based on a 2D contour of the object in each of the 2D projection images of that cardiac phase.

2. The method of claim 1, wherein the step of reconstructing a 3D volume from a plurality of 2D projection images comprises:
reconstructing the 3D volume from a plurality of 2D projection images acquired in a single C-arm angiography scan.

3. The method of claim 1, wherein the step of extracting a static mesh by segmenting an object in the 3D volume comprises:
segmenting the object in the 3D volume using marginal space learning (MSL).

4. The method of claim 1, wherein the step of projecting the static mesh to each of the 2D projection images comprises:
projecting mesh points of the static mesh onto each 2D projection image while preserving connectivity between the mesh points.

5. The method of claim 1, wherein the step of determining a cardiac phase for each of the 2D projection images comprises:
determining the cardiac phase for each of the 2D projection images based on cardiac phase information captured in an electrocardiograph (ECG) signal.

6. The method of claim 1, wherein the step of determining a cardiac phase for each of the 2D projection images comprises:
determining a size of the object from the 2D contour in each of the 2D projection images;
plotting the size of the object in the 2D projection images with respect to rotation angles associated with the 2D projection images;
detecting each 2D projection images at which a local maximum of the size of the object occurs, wherein each 2D projection image at which a local maximum occurs corresponds to a beginning of a new cardiac cycle; and
determining relative phases for 2D projection images between the 2D projection images corresponding to a beginning of a new cardiac cycle by linearly interpolating between the 2D projection images corresponding to a beginning of a new cardiac cycle.

7. The method of claim 1, wherein the step of generating a deformed mesh for each of a plurality of cardiac phases based on a 2D contour of the object in each of the 2D projection images of that cardiac phase comprises:
generating a silhouette of the projected mesh in each of the 2D projection images;
determining deformed positions of silhouette points in each of the 2D projection images based on the 2D contour of the object in each of the 2D projection images;
for each of the plurality of cardiac phases, determining deformations for a set of anchor points for the cardiac phase by converting the deformed positions for the silhouette points in 2D projection images of the cardiac phase to deformed positions of corresponding mesh points of the static mesh, wherein the corresponding mesh points of the static mesh are the anchor points for the cardiac phase; and for each of the plurality of cardiac phases, generating a deformed mesh by deforming the static mesh based on the deformations determined for the anchor points for the cardiac phase.

8. The method of claim 7, wherein the step of generating a silhouette of the projected mesh in each of the 2D projection images comprises, for each 2D projection image:

generating silhouette candidate edges in the projected mesh;

splitting each silhouette candidate edge that intersects with another edge in the projected mesh into two silhouette candidate edges; and extracting the silhouette using an edge following process on the silhouette candidate edges.

9. The method of claim 8, wherein the step of generating silhouette candidate edges in the projected mesh comprises:

determining a number of triangles adjacent to each edge of the projected mesh;

if the number of triangles adjacent to the edge is one, determining the edge to be a silhouette candidate edge;

if the number of triangles adjacent to the edge is two, determining that the edge is an edge candidate when $C_1$ and $C_2$ lie on the same side of the edge, where the edge has two endpoints A and B which are shared by the two triangle faces, and $C_1$ and $C_2$ refer to a third point in each of the two triangle faces, respectively.

10. The method of claim 8, wherein the step of determining deformed positions of silhouette points in each of the 2D projection images based on the 2D contour of the object in each of the 2D projection images comprises:

determining deformed positions of silhouette points corresponding to mesh points of the projected mesh in each of the 2D projection images.

11. The method of claim 7, wherein the step of determining deformed positions of silhouette points in each of the 2D projection images based on the 2D contour of the object in each of the 2D projection images comprises, for each silhouette point corresponding to a projected mesh point of the static mesh:

determining a projected normal direction in the 2D projection image corresponding to a normal direction from the corresponding mesh point of the static mesh in 3D;

determining the deformed position of the silhouette point as the intersection of the 2D contour of the object and a line extending from the silhouette point in the projected normal direction.

12. The method of claim 11, wherein the step of determining a projected normal direction in the 2D projection image corresponding to a normal direction from the corresponding mesh point of the static mesh in 3D:

detecting the normal direction from the corresponding mesh point of the static mesh to be an average of normal directions of triangles adjacent to the mesh point of the static mesh;

selecting an arbitrary point along the normal direction from the corresponding mesh point of the static mesh;

projecting the arbitrary point to the 2D projection image; and defining the projected normal direction by a line connecting the silhouette point to the projected arbitrary point.

13. The method of claim 7, wherein the step of generating a deformed mesh by deforming the static mesh based on the deformations determined for the anchor points for the cardiac phase comprises:

calculating a deformation of each mesh point in the static mesh using thin-plane spline (TPS) interpolation based on the anchor points for the cardiac phase and the deformations determined for the anchor points for the cardiac phase.

14. The method of claim 1, further comprising:

projecting the deformed mesh generated for each of the plurality of cardiac phases onto the 2D projection images of the cardiac phase; and generating a second deformed mesh for each of a plurality of cardiac phases based on the 2D contour of the object and the projected deformed mesh in each of the 2D projection images of that cardiac phase.

15. The method of claim 1, wherein the object comprises at least one of a left ventricle, a left ventricle outflow tract, and an aorta.

16. An apparatus for estimating 3D motion of an object from a set of 2D projection images, comprising:

means for reconstructing a 3D volume from a plurality of 2D projection images;

means for extracting a static mesh by segmenting an object in the 3D volume;

means for projecting the static mesh to each of the 2D projection images;

means for determining a cardiac phase for each of the 2D projection images; and means for generating a deformed mesh for each of a plurality of cardiac phases based on a 2D contour of the object in each of the 2D projection images of that cardiac phase.

17. The apparatus of claim 16, wherein the plurality of 2D projection images comprises a plurality of 2D projection images acquired in a single C-arm angiography scan.

18. The apparatus of claim 16, wherein the means for extracting a static mesh by segmenting an object in the 3D volume comprises:

means for segmenting the object in the 3D volume using marginal space learning (MSL).

19. The apparatus of claim 16, wherein the means for determining a cardiac phase for each of the 2D projection images comprises:

means for determining the cardiac phase for each of the 2D projection images based on cardiac phase information captured in an electrocardiograph (ECG) signal.

20. The apparatus of claim 16, wherein the means for determining a cardiac phase for each of the 2D projection images comprises:

means for determining a size of the object from the 2D contour in each of the 2D projection images;

means for plotting the size of the object in the 2D projection images with respect to rotation angles associated with the 2D projection images;

means for detecting each 2D projection images at which a local maximum of the size of the object occurs, wherein each 2D projection image at which a local maximum occurs corresponds to a beginning of a new cardiac cycle; and means for determining relative phases for 2D projection images between the 2D projection images corresponding to a beginning of a new cardiac cycle by linearly interpolating between the 2D projection images corresponding to a beginning of a new cardiac cycle.

21. The apparatus of claim 16, wherein the apparatus generating a deformed mesh for each of a plurality of cardiac phases based on a 2D contour of the object in each of the 2D projection images of that cardiac phase comprises:
    means for generating a silhouette of the projected mesh in each of the 2D projection images;
    means for determining deformed positions of silhouette points in each of the 2D projection images based on the 2D contour of the object in each of the 2D projection images;
    means for determining deformations for a set of anchor points for a cardiac phase by converting the deformed positions for the silhouette points in 2D projection images of the cardiac phase to deformed positions of corresponding mesh points of the static mesh, wherein the corresponding mesh points of the static mesh are the anchor points for the cardiac phase; and
    means for generating a deformed mesh for the cardiac phase by deforming the static mesh based on the deformations determined for the anchor points for the cardiac phase.

22. The apparatus of claim 21, wherein the means for generating a silhouette of the projected mesh in each of the 2D projection images comprises:
    means for generating silhouette candidate edges in the projected mesh in a 2D projection image;
    means for splitting each silhouette candidate edge that intersects with another edge in the projected mesh into two silhouette candidate edges; and
    means for extracting the silhouette using an edge following process on the silhouette candidate edges.

23. The apparatus of claim 21, wherein the means for determining deformed positions of silhouette points in each of the 2D projection images based on the 2D contour of the object in each of the 2D projection images comprises:
    means for determining a projected normal direction in the 2D projection image corresponding to a normal direction from a corresponding mesh point of the static mesh in 3D a silhouette point in a 2D projection image;
    means for determining the deformed position of the silhouette point as the intersection of the 2D contour of the object and a line extending from the silhouette point in the projected normal direction.

24. The apparatus of claim 21, wherein the means for generating a deformed mesh for the cardiac phase by deforming the static mesh based on the deformations determined for the anchor points for the cardiac phase comprises:
    means for calculating a deformation of each mesh point in the static mesh using thin-plane spline (TPS) interpolation based on the anchor points for the cardiac phase and the deformations determined for the anchor points for the cardiac phase.

25. The apparatus of claim 16, further comprising:
    means for projecting the deformed mesh generated for each of the plurality of cardiac phases onto the 2D projection images of the cardiac phase; and
    means for generating a second deformed mesh for each of a plurality of cardiac phases based on the 2D contour of the object and the projected deformed mesh in each of the 2D projection images of that cardiac phase.

26. A non-transitory computer readable medium encoded with computer executable instruction for estimating 3D motion of an object from a set of 2D projection images, the computer executable instructions defining a method comprising:
    reconstructing a 3D volume from a plurality of 2D projection images;
    extracting a static mesh by segmenting an object in the 3D volume;
    projecting the static mesh to each of the 2D projection images;
    determining a cardiac phase for each of the 2D projection images; and
    generating a deformed mesh for each of a plurality of cardiac phases based on a 2D contour of the object in each of the 2D projection images of that cardiac phase.

27. The non-transitory computer readable medium of claim 26, wherein the step of reconstructing a 3D volume from a plurality of 2D projection images comprises:
    reconstructing the 3D volume from a plurality of 2D projection images acquired in a single C-arm angiography scan.

28. The non-transitory computer readable medium of claim 26, wherein the step of extracting a static mesh by segmenting an object in the 3D volume comprises:
    segmenting the object in the 3D volume using marginal space learning (MSL).

29. The non-transitory computer readable medium of claim 26, wherein the step of the static mesh to each of the 2D projection images comprises:
    projecting mesh points of the static mesh onto each 2D projection image while preserving connectivity between the mesh points.

30. The non-transitory computer readable medium of claim 26, wherein the step of determining a cardiac phase for each of the 2D projection images comprises:
    determining the cardiac phase for each of the 2D projection images based on cardiac phase information captured in an electrocardiograph (ECG) signal.

31. The non-transitory computer readable medium of claim 26, wherein the step of determining a cardiac phase for each of the 2D projection images comprises:
    determining a size of the object from the 2D contour in each of the 2D projection images;
    plotting the size of the object in the 2D projection images with respect to rotation angles associated with the 2D projection images;
    detecting each 2D projection images at which a local maximum of the size of the object occurs, wherein each 2D projection image at which a local maximum occurs corresponds to a beginning of a new cardiac cycle; and
    determining relative phases for 2D projection images between the 2D projection images corresponding to a beginning of a new cardiac cycle by linearly interpolating between the 2D projection images corresponding to a beginning of a new cardiac cycle.

32. The non-transitory computer readable medium of claim 26, wherein the step of generating a deformed mesh for each of a plurality of cardiac phases based on a 2D contour of the object in each of the 2D projection images of that cardiac phase comprises:
    generating a silhouette of the projected mesh in each of the 2D projection images;
    determining deformed positions of silhouette points in each of the 2D projection images based on the 2D contour of the object in each of the 2D projection images;
    for each of the plurality of cardiac phases, determining deformations for a set of anchor points for the cardiac phase by converting the deformed positions for the silhouette points in 2D projection images of the cardiac phase to deformed positions of corresponding mesh points of the static mesh, wherein the corresponding mesh points of the static mesh are the anchor points for the cardiac phase; and for each of the plurality of cardiac phases, generating a deformed mesh by deforming the static mesh based on the deformations determined for the anchor points for the cardiac phase.

33. The non-transitory computer readable medium of claim 32, wherein the step of generating a silhouette of the projected mesh in each of the 2D projection images comprises, for each 2D projection image:
    generating silhouette candidate edges in the projected mesh;
    splitting each silhouette candidate edge that intersects with another edge in the projected mesh into two silhouette candidate edges; and
    extracting the silhouette using an edge following process on the silhouette candidate edges.

34. The non-transitory computer readable medium of claim 33, wherein the step of generating silhouette candidate edges in the projected mesh comprises:
    determining a number of triangles adjacent to each edge of the projected mesh;
    if the number of triangles adjacent to the edge is one, determining the edge to be a silhouette candidate edge;
    if the number of triangles adjacent to the edge is two, determining that the edge is an edge candidate when $C_1$ and $C_2$ lie on the same side of the edge, where the edge has two endpoints A and B which are shared by the two triangle faces, and $C_1$ and $C_2$, refer to a third point in each of the two triangle faces, respectively.

35. The non-transitory computer readable medium of claim 33, wherein the step of determining deformed positions of silhouette points in each of the 2D projection images based on the 2D contour of the object in each of the 2D projection images comprises:
    determining deformed positions of silhouette points corresponding to mesh points of the projected mesh in each of the 2D projection images.

36. The non-transitory computer readable medium of claim 32, wherein the step of determining deformed positions of silhouette points in each of the 2D projection images based on the 2D contour of the object in each of the 2D projection images comprises, for each silhouette point corresponding to a projected mesh point of the static mesh:
    determining a projected normal direction in the 2D projection image corresponding to a normal direction from the corresponding mesh point of the static mesh in 3D;
    determining the deformed position of the silhouette point as the intersection of the 2D contour of the object and a line extending from the silhouette point in the projected normal direction.

37. The non-transitory computer readable medium of claim 36, wherein the step of determining a projected normal direction in the 2D projection image corresponding to a normal direction from the corresponding mesh point of the static mesh in 3D:
    detecting the normal direction from the corresponding mesh point of the static mesh to be an average of normal directions of triangles adjacent to the mesh point of the static mesh;
    selecting an arbitrary point along the normal direction from the corresponding mesh point of the static mesh;
    projecting the arbitrary point to the 2D projection image; and
    defining the projected normal direction by a line connecting the silhouette point to the projected arbitrary point.

38. The non-transitory computer readable medium of claim 32, wherein the step of generating a deformed mesh by deforming the static mesh based on the deformations determined for the anchor points for the cardiac phase comprises:
    calculating a deformation of each mesh point in the static mesh using thin-plane spline (TPS) interpolation based on the anchor points for the cardiac phase and the deformations determined for the anchor points for the cardiac phase.

39. The non-transitory computer readable medium of claim 26, wherein the method further comprises:
    projecting the deformed mesh generated for each of the plurality of cardiac phases onto the 2D projection images of the cardiac phase; and
    generating a second deformed mesh for each of a plurality of cardiac phases based on the 2D contour of the object and the projected deformed mesh in each of the 2D projection images of that cardiac phase.

* * * * *